United States Patent
Askerup et al.

(10) Patent No.: US 7,483,521 B2
(45) Date of Patent: Jan. 27, 2009

(54) DATABASE FOR USE IN TELEPHONE COMMUNICATIONS

(75) Inventors: Hans Anders Askerup, Omaha, NE (US); Rob W. Heldenbrand, Omaha, NE (US); Mark A. Montz, Elkhorn, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/584,835

(22) Filed: Oct. 23, 2006

(65) Prior Publication Data

US 2007/0129066 A1 Jun. 7, 2007

Related U.S. Application Data

(62) Division of application No. 10/655,242, filed on Sep. 3, 2003, now Pat. No. 7,142,647.

(51) Int. Cl.
*H04M 1/64* (2006.01)

(52) U.S. Cl. ............... 379/88.2; 379/120; 379/201.02; 379/266.02; 456/414.1

(58) Field of Classification Search ............... 455/433, 455/408, 417, 414.1; 379/88.02, 201.05, 379/88.2, 120, 201.02, 266.02
See application file for complete search history.

(56) References Cited

U.S. PATENT DOCUMENTS

| 6,397,055 B1 * | 5/2002 | McHenry et al. ............ 455/408 |
| 6,944,445 B2 * | 9/2005 | Lee ............................ 455/417 |
| 6,975,862 B1 * | 12/2005 | Garland et al. ............... 455/433 |
| 2001/0055379 A1 * | 12/2001 | Mamiya et al. ........ 379/201.05 |

* cited by examiner

*Primary Examiner*—Gerald Gauthier

(57) ABSTRACT

Techniques for storing data used in making announcements in telephone communications are disclosed. In an embodiment, an announcement depends on classes of services associated with telephone subscribers. The classes of services represent call types or call features such as call-forwarding unconditional, call-forwarding busy, call-forwarding no answer, etc. A first database associates subscribed phone numbers with a class of service. A second database defines the class of services such as the call types, the telephone digit pattern in the subscribed telephone numbers, the condition for an announcement, etc. A third database defines a default class of service for use in case a phone number is not associated with a class of service in the first database.

13 Claims, 3 Drawing Sheets

DATABASE FOR USE IN TELEPHONE COMMUNICATIONS

CROSS-REFERENCE TO RELATED APPLICATIONS

This application is a divisional of U.S. application Ser. No. 10/655,242, titled "DATABASE FOR USE IN TELEPHONE COMMUNICATIONS," filed on Sep. 3, 2003 now U.S. Pat. No. 7,142,647. A Notice of Allowance with regard to the preceding application was mailed on Sep. 15, 2006. The specification of the preceding application is incorporated herein by reference.

BACKGROUND

In various situations in telephone communications, it is desirable that, after a caller initiates a call, an announcement is made to notify the caller, for example, the status of the call, the charge that might incur to the caller, etc. In one approach, the announcement system defines a call type and a specific announcement for each subscriber so that such an announcement may be made when appropriate. Unfortunately, when numerous subscribers are involved, provisioning for every subscriber results in managing huge amounts of data. For example, each time a call type is added, data for up to millions of subscribers related to the new call type must be updated. Such process is also tedious, error prone, and expensive. Therefore, what is needed is mechanisms to solve the above deficiencies and related problems.

SUMMARY

The present invention provides techniques for storing data used in making announcements in telephone communications. In an embodiment, an announcement depends on classes of services associated with telephone subscribers. The classes of services represent call types or call features such as call-forwarding unconditional, call-forwarding busy, call-forwarding no answer, etc. A first database associates subscribed phone numbers with a class of service. A second database defines the class of services such as the call types, the telephone digit pattern in the subscribed telephone numbers, the condition for an announcement, etc. A third database defines a default class of service for use in case a phone number is not associated with a class of service in the first database.

Generally, a class of service includes one or a plurality of call types, and a telephone subscriber is associated with a class of service based on which an announcement is made when some conditions are met. For example, if a subscriber is associated with a class of service that includes the call type "call-forward-busy," then, when a caller receives a call busy signal from the subscriber, an announcement is made that the subscriber is busy and the call is forwarded to, e.g., the subscriber's voicemail. For another example, if the same class of service also includes the call type "call-forward-no-answer", then, when the subscriber does not answer a telephone call, an announcement is made that the phone call is forwarded to another number, etc.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

In the following description, for the purposes of explanation, numerous specific details are set forth in order to provide a thorough understanding of the present invention. However, it will be apparent to one skilled in the art that the invention may be practiced without these specific details. In other instances, well-known structures and devices are shown in block diagram form in order to avoid obscuring the invention.

Overview

Figure 1:
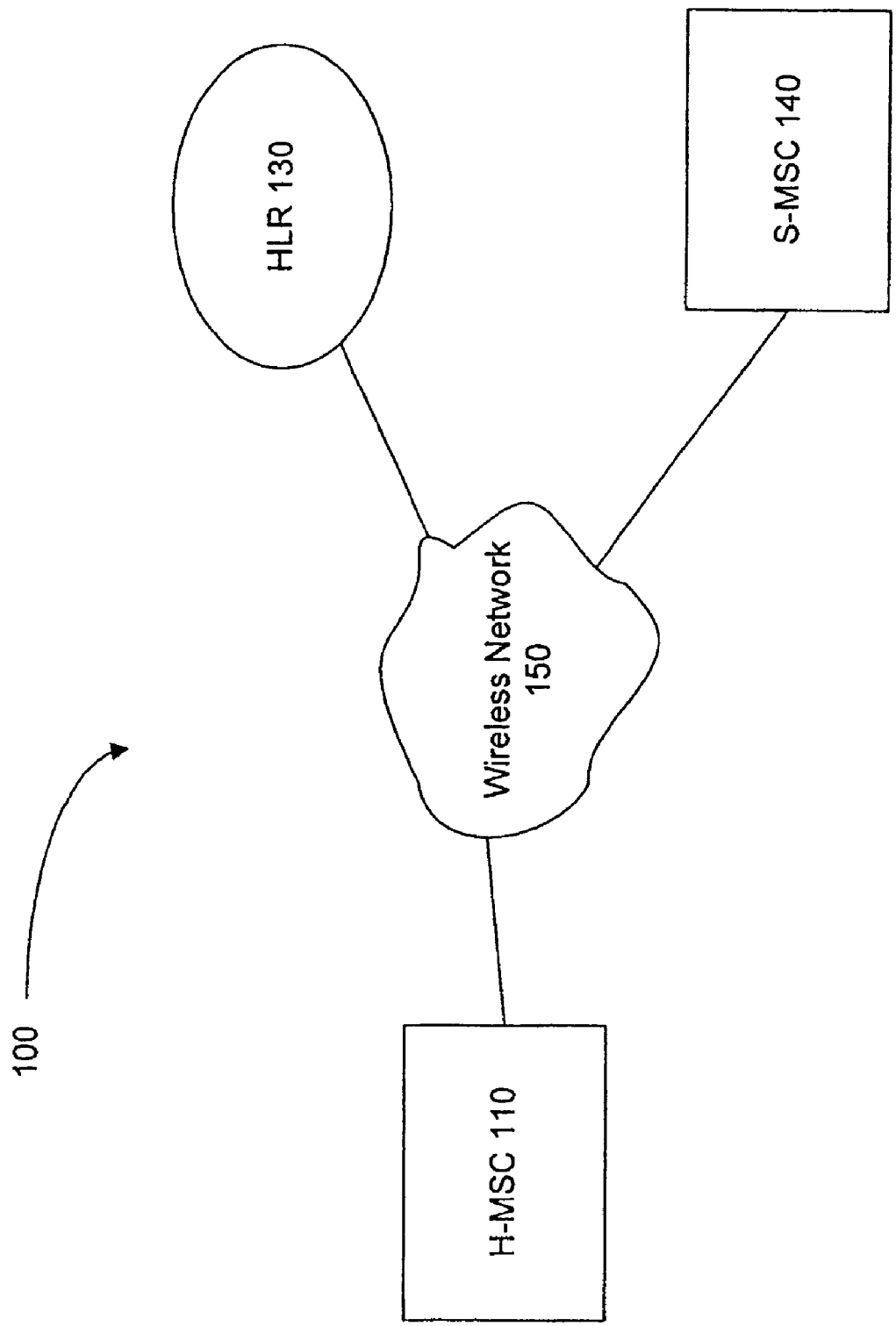
FIG. 1 shows an exemplary telephone network upon which embodiments of the invention may be implemented.

FIG. 1 shows a telephone network 100 upon which embodiments of the invention may be implemented. Telephone network 100 includes a home mobile switch center (H-MSC) 110, a home location register (HLR) 130, a serving mobile switch center (S-MSC) 140, and a wireless network 150.

A subscribed phone number (or subscriber) is associated with a H-MSC 110. When the subscriber is called, regardless of the location of the subscriber at that time, the call, based on the first six digit of the subscriber, is routed to its H-MSC 110. H-MSC 110 includes information such as the network provider and the HLR 130 of the subscriber from which the subscriber may be located as appropriate. Normally, H-MSC 110 sends a Location Request Invoke (LocReq) to HLR 130 to request the location of the subscriber. When a subscriber travels outside the coverage area of its H-MSC 110, H-MSC 110, together with a S-MSC 140, provides services to the subscriber.

HLR 130 is a database storing data for subscribers and, in an embodiment, can handle millions of subscribers. HLR 130 includes data files that associate subscribers with classes of services, define the classes of services, etc., based on which HLR 130 may determine the call type and the announcement code that are associated with a subscriber. HLR 130 also stores information to locate subscribers, the S-MSC 140 that covers an area to which the subscriber travels, etc. To locate a subscriber, HLR 130 sends a Routing Request Invoke (RouteReq) to the corresponding S-MSC 140. Generally, when a subscriber is in the service area of S-MSC 140, S-MSC 140 informs the corresponding HLR 130 that S-MSC 140 now serves the traveling subscriber.

S-MSC 140 serves subscribers when the subscribers travel outside of their H-MSC 110. Generally, when a subscriber travels within the service area of an S-MSC 140, the S-MSC 140, after locating the subscriber, sends a Registration Notification Invoke (RegNot) to the HLR 130 to register with HLR 130 that S-MSC 140 now serves the subscriber. Embodiments of the invention are not limited to how an MSC, e.g., H-MSC or S-MSC, locates a subscriber. In general, an MSC is associated with the area code of the phone number.

Wireless network 150 provides protocols for H-MSC 110, HLR 130, and S-MSC 140 to communicate with one another. In an embodiment, network 150 uses the Signaling System 7 (SS7) and the American National Standards Institutes (ANSI) 41 protocols. The SS7 is normally used for efficient and secure telecommunications and wireless services such as personal communication services (PCS), wireless roaming, mobile-subscriber authentication, call setup, management, etc. Examples of other protocols that may be used in network 150 include the global system for mobile communications (GSM), the message mobile application port (MAP), etc. Embodiments of the invention are not limited by the types of network and/or the protocols used in a network.

Once a call is connected, a call path is created between the calling phone, H-MSC 110, network 150, S-MSC 140, and the called subscriber.

Call Announcements

In an embodiment, a caller receives an announcement depending on a class of service associated with the called subscriber in which the class of service includes the call types or call features of the called subscriber. For example, if the called subscriber has the call type "call-forwarding unconditional" or "call forward no answer," then the announcement indicates that the call is being transferred to, e.g., an email, voice message center, etc. If there is a charge to the caller, then the announcement so indicates, and if the caller does not want to be charged, the call will not be connected, etc.

Call Types

The followings are examples of call types and conditions to trigger a corresponding announcement. Embodiments of the invention are not limited to this exemplary list of call types, but are also applicable to other call types.

CFU: call forwarding unconditional. After the caller initiates the call, an announcement is made that the call is forwarded to another phone number, a voicemail, etc.

CFB: call forwarding busy. When the caller receives a busy signal from the subscriber, an announcement is made that the call is forwarded to another number, a voicemail, etc.

CFNRI: call forwarding not registered/inactive. After the caller initiates the call, an announcement is made that the subscriber is currently not registered in the network and cannot be reached.

CFNA: call forwarding no answer. After a number of rings that the callee does not answer the call, an announcement is made that the call is forwarded to another number, a voice mail, etc.

SCA: selective call acceptance. The callee accepts only some selective numbers, and when a number not in the selective list is detected, an announcement is made that the call cannot be connected.

PCA: password call acceptance. The callee accepts a call only when the caller provides a correct password, and when the call is initiated, an announcement is made asking the caller to provide the password, and if an incorrect password is provided, an announcement is made that the call cannot be connected, etc.

DND: do not disturb. After the caller initiates the call, an announcement is made that the callee does not accept the call at that time.

CD: call delivery. The subscriber is registered in H-MSC 110 or S-MSC 140, is not busy, does not have DND active, etc., and the call is connected.

FA: flexible alerting. A call may be made via a pilot number to ring a plurality of numbers. When the pilot phone is used to call the pilot number, an announcement so indicates, and the system calls all the group members.

MAH: mobile access hunt. This feature is similar to the FA feature, however, the MAH allows to call each group member one at a time and the call is connected when the first group member picks up the phone.

In an embodiment, each announcement corresponding to a call type is identified by an announcement code. For example, announcement code ANNCODE(1) corresponds to call type CFU, announcement code ANNCODE(2) corresponds to call type CFB, announcement code ANNCODE(3) corresponds to call type CFRNI, etc.

The HLR Database

Figure 2:
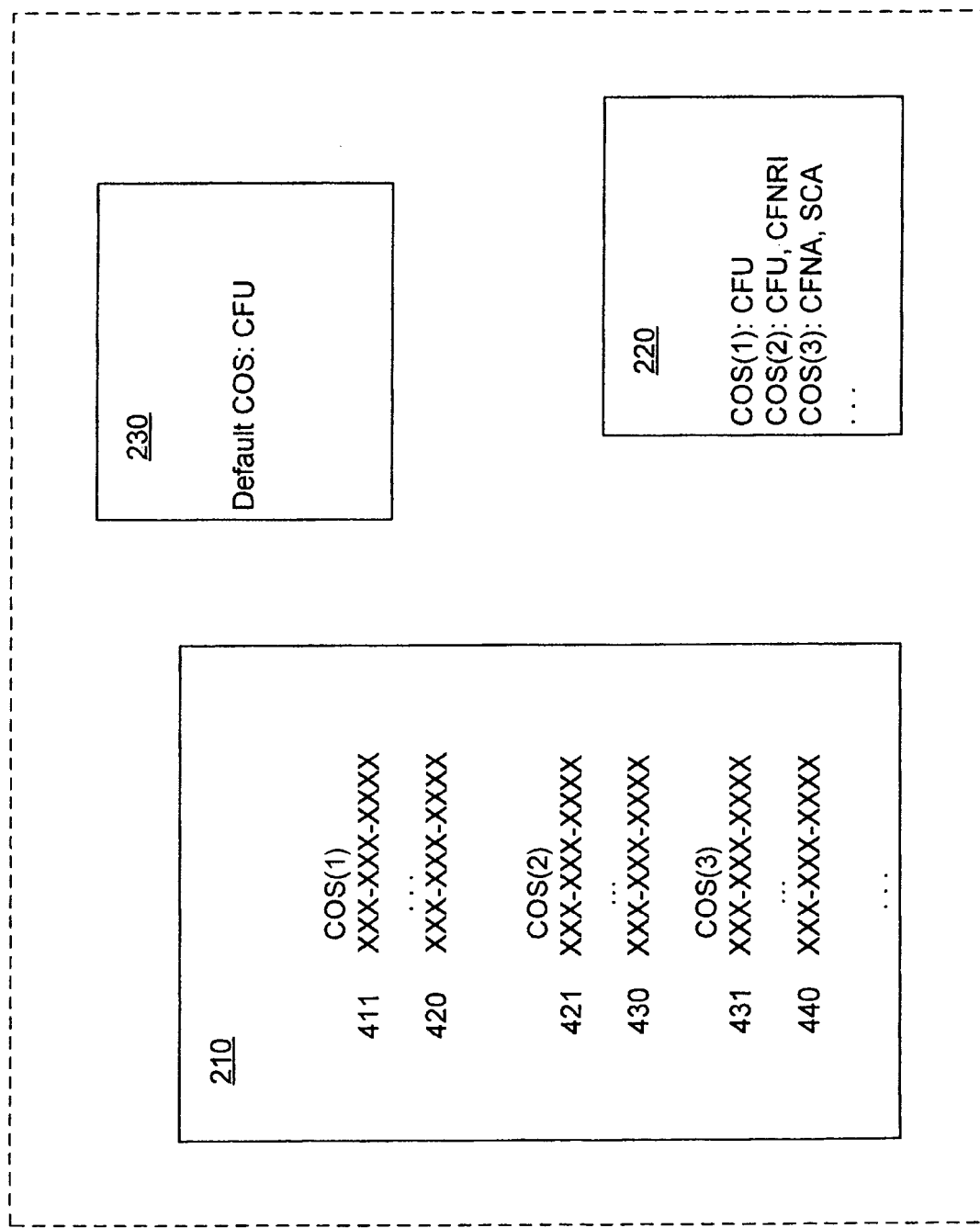
FIG. 2 shows a database used by the Home Location Register in FIG. 1, in accordance with an embodiment.

FIG. 2 shows database HLR 130, in accordance with an embodiment that includes sub-databases or files 210, 220, and 230.

Database 210 includes the subscribed phone numbers and their corresponding classes of service (COS). A phone number thus has the call types defined in its corresponding class of service. In the example of FIG. 2, phone numbers from lines 411-420, 421430, and 431-440 are associated with COS(1), COS(2), and COS(3), and are thus associated with the call types in COS(1), COS(2), and COS(3), respectively.

Database 220 defines the features for each class of service, which may include one or a combination of call types. A call type may be in one or a plurality of class of service. For example, in FIG. 2, class of service COS(1) includes call type CFU; class of service COS(2) includes call types CFU, CFNRI; and class of service COS(3) includes CFNA, SCA, etc. In an embodiment, a class of service also specifies a digit pattern, which allows further refine the applicability of the announcement by using a pattern of the digit string, such as playing a specific announcement if the area code is 402 and/or the next three digits of the subscribed number is 384, etc.

Database 230 specifies the default class of services to be used in case the subscribers in database 210 are not associated with a class of service. The default class of service in the example of FIG. 2 is CFU.

The data stored in each database in FIG. 2 is in accordance with an embodiment, but the invention is not limited to such arrangements. Various other arrangements are within the scope of embodiments of the invention. For example, the default class of service may be stored in either database 210 or 220; a portion or all data in database 220 and/or 230 may be stored in database 210; HLR 130 includes all data in one file without having sub-databases or files 210, 220, 230, etc.

Illustrative Method for Making an Announcement in a Telephone Connection

Figure 3:
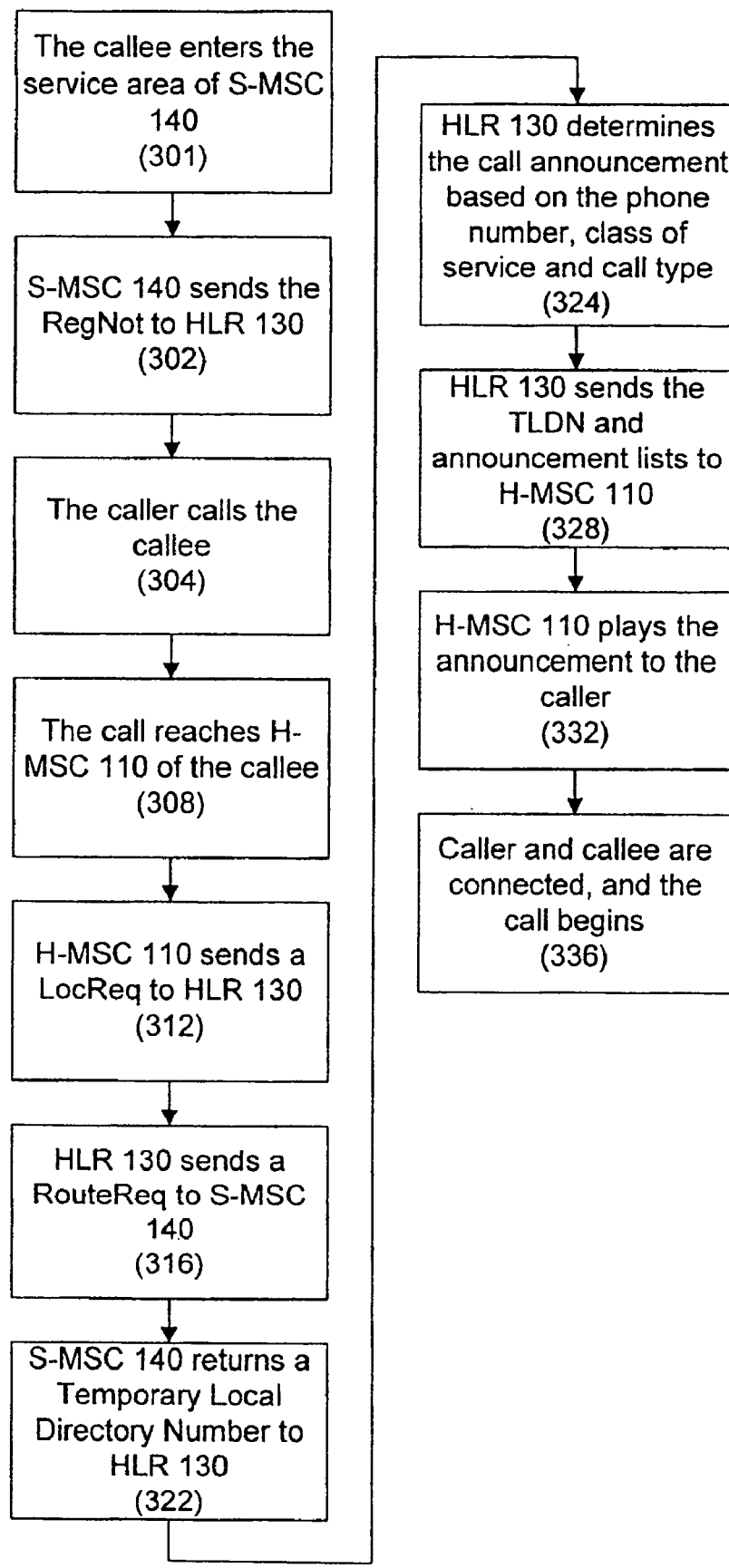
FIG. 3 shows a flowchart illustrating how an announcement is made, in accordance with an embodiment.

FIG. 3 shows a flowchart illustrating how an announcement is made, in accordance with an embodiment. For illustration purposes, a first person (the caller) uses a phone to call a second person (the callee) who has a phone number as a subscriber in HLR 130. Further, the callee and thus his phone have traveled outside of the phone's H-MSC 110.

In step 301, the callee and thus the wireless phone subscriber enter the service area of S-MSC 140.

In step 302, S-MSC 140, having located the called subscriber, sends the Registration Notification Invoke RegNot to HLR 130.

In step 304, the caller calls the callee.

In step 308, the call reaches H-MSC 110 of the callee.

In step 312, H-MSC 110 sends a LocReq to HLR 130.

In step 316, HLR 130 sends a RouteReq to the S-MSC 140.

In step 322, S-MSC 140 returns a Temporary Local Directory Number (TLDN), which will be used by H-MSC 110 to route the call to S-MSC 140 in step 336.

In step 324, HLR 130, based on the subscriber phone number, determines the class of service of the subscriber that includes the call types and based on which HLR 130 determines the appropriate announcement.

In step 328, HLR 130 sends a response to the LocReq of H-MSC 110. HLR 130 also includes the TLDN and the announcement list parameter containing the announcement(s).

In step 332, H-MSC 110 plays the announcement to the caller.

In step 336, the caller and the callee are connected, and the call begins.

Embodiments of the invention are advantageous over other approaches because a class of service may be associated with a plurality of subscribers, which reduces the burden of data entry for operators and the risk for entering erroneous data. For example, in one approach, if there are 2 million subscribers, then there are 2 million entries for call types each corresponding to a subscriber. However, using techniques of the invention, and, for illustration purposes, if a class of service is associated with 2000 subscribers, then there are only 1000 (2,000,000/2,000) entries of class of services.

In the foregoing specification, the invention has been described with reference to specific embodiments. However, it will be evident that various modifications and changes may be made without departing from the broader spirit and scope of the invention. Accordingly, the specification and drawings are to be regarded as illustrative rather than as restrictive.

What is claimed is:

1. A telephone network comprising:
   a home mobile switch center and a serving mobile switch center for providing services to telephone subscribers;
   a database, including:
      a first file comprising telephone numbers and classes of service assigned to the telephone numbers, wherein a first class of service is assigned to a first group of the telephone numbers, and a second class of service is assigned to a second group of the telephone numbers; and
      a second file comprising the classes of service and call types assigned to the classes of service, wherein a first plurality of call types are assigned to the first class of service, a second plurality of call types are assigned to the second class of service, and the first plurality of class types has at least one call type different from the call types of the second plurality of call types; and
   a wireless network providing communication protocols for the home mobile switch center, the serving mobile switch center, and the database to communicate with one another, wherein upon a telephone connection of a selected telephone number of the first and second groups of the telephone numbers, the first file is configured to be used to determine the class of service assigned to the selected telephone number and, based on the determined class of service assigned to the selected telephone number, the second file is configured to be used to make an announcement to a telephone subscriber.

2. The telephone network of claim 1, wherein the database is a home location register.

3. The telephone network of claim 1, wherein each of the classes of service assigned to the telephone numbers includes a digit pattern and the announcment is made further based on the digit pattern.

4. The telephone network of claim 1, wherein if a phone number of a called subscriber of the telepone subscribers is not associated with a class of service in the first file using a default class of service in making an announcment to a calling subscriber of the telephone subscribers.

5. A telephone network comprising:
   a home mobile switch center and a service mobile switch center for providing services to telephone subscribers;
   a home location register storing:
      a first file comprising telephone numbers and classes of service assigned to the telephone numbers, wherein a first class of service is assigned to a first group of the telephone numbers and a second class of service is assigned to a second group of the telephone numbers; and
      a second file comprising the classes of service and call types assigned to the classes of service, wherein a first plurality of call types are assigned to the first class of service, a second plurality of call types are assigned to the second class of service, and the first plurality of class types has at least one call type different from the call types of the second plurality of call types; and
   a wireless network providing communication protocols for the home mobile switch center, the serving mobile switch center, and the home location register to communicate with one another,
   wherein upon a telephone connection of a selected telephone number of the first and second groups of the telephone numbers, the first file is configured to be used to determine the class of service assigned to the selected telephone number and, and based on the determined class of service assigned to the selected telephone number, the second file is configured to be used to make an annoucement to a telephone subscriber and number.

6. The telephone network of claim 5, wherein the serving mobile switch center provides the services when the telephone subscribers travel out of the coverage range of the home mobile service center.

7. The telephone network or claim 5, wherein each of the classes of service assigned to the telephone numbers includes a digit pattern and the announcement is made further based on the digit pattern.

8. The telephone network of claim 5, wherein the call types assigned to the classes of service includes at least one of call-forwarding unconditional (CFU), call-forwarding busy (CFB); password call acceptance (PCA); and do not disturb (DND).

9. The telephone network of claim 5, wherein the announcement that is made is identified based on an announcement code corresponding to a call type.

10. The telephone network of claim 5, wherein if a phone number of a called subscriber of the telephone subscribers is not associated with a class of service in the first file, using a default class of service in making an anouncement to a calling subscriber of the telephone subscribers.

11. A method comprising:
   storing in a home location register a first file comprising telephone numbers and classes of service assigned to the telephone numbers, wherein a first class of service is assigned to a first group of the telephone numbers, and a second class of service is assigned to a second group of the telephone numbers; and
   storing in the home location register a second file comprising the classes of service and call types assigned to the classes of service, wherein a first plurality of call types are assigned to the first class of service, a second plurality of call types are assigned to the second class of service, and the first plurality of class types has at least one call type different from the call types of the second plurality of call types;

upon a telephone connection of a selected telephone number of the first and second group of the telephone numbers, using the first file to determine the class of service assigned to the selected telephone number; and based on the determined class of service assigned to the selected telephone number, using the second file to make an announcement to a telephone subscriber.

12. The method of claim 11, wherein the announcement that is made is played to a caller of the telephone subscriber.

13. The method of claim 11, wherein the telephone subscriber is a calling telephone subscriber and, if a phone number of a called telephone subscriber is not associated with a class of service in the first file, using a default class of service in making an announcement to the calling telephone subscriber.

* * * * *

UNITED STATES PATENT AND TRADEMARK OFFICE
CERTIFICATE OF CORRECTION

| | | |
|---|---|---|
| PATENT NO. | : 7,483,521 B2 | Page 1 of 2 |
| APPLICATION NO. | : 11/584835 | |
| DATED | : January 27, 2009 | |
| INVENTOR(S) | : Hans Anders Askerup et al. | |

It is certified that error appears in the above-identified patent and that said Letters Patent is hereby corrected as shown below:

In column 4, line 17, delete "421430" and insert -- 421-430 --, therefor.

In column 5, line 33, in Claim 1, delete "flrst" and insert -- first --, therefor.

In column 5, line 61, in Claim 3, delete "announcment" and insert -- announcement --, therefor.

In column 5, line 64, in Claim 4, delete "telepone" and insert -- telephone --, therefor.

In column 5, line 65, in Claim 4, delete "file" and insert -- file, --, therefor.

In column 5, line 66, in Claim 4, delete "announcment" and insert -- announcement --, therefor.

In column 6, line 2, in Claim 5, delete "service" and insert -- servicing --, therefor.

In column 6, line 8, in Claim 5, delete "numbers" and insert -- numbers, --, therefor.

In column 6, line 26, in Claim 5, delete "and" before "based".

In column 6, line 30, in Claim 5, delete "annoucement" and insert -- announcement --, therefor.

In column 6, line 30, in Claim 5, after "subscriber" delete "and number".

In column 6, line 35, in Claim 7, delete "or" and insert -- of --, therefor.

In column 6, line 51, in Claim 10, delete "anouncement" and insert -- announcement --, therefor.

In column 6, line 62, in Claim 11, delete "pluraity" and insert -- plurality --, therefor.

CERTIFICATE OF CORRECTION (continued)
U.S. Pat. No. 7,483,521 B2

In column 7, line 2, in Claim 11, delete "group" and insert -- groups --, therefor.

Signed and Sealed this

Fifth Day of January, 2010

David J. Kappos
*Director of the United States Patent and Trademark Office*